(12) United States Patent
Kumagai (10) Patent No.: US 11,968,480 B2
(45) Date of Patent: Apr. 23, 2024

(54) DISPLAY METHOD AND DISPLAY SYSTEM

(71) Applicant: SEIKO EPSON CORPORATION, Tokyo (JP)

(72) Inventor: Tomonori Kumagai, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/704,165

(22) Filed: Mar. 25, 2022

(65) Prior Publication Data

US 2022/0311980 A1 Sep. 29, 2022

(30) Foreign Application Priority Data

Mar. 26, 2021 (JP) ................................ 2021-052914

(51) Int. Cl.
| | |
|---|---|
| G09F 3/03 | (2006.01) |
| G06F 3/0354 | (2013.01) |
| G06F 3/038 | (2013.01) |
| H04N 9/31 | (2006.01) |

(52) U.S. Cl.
CPC ....... H04N 9/3194 (2013.01); G06F 3/03545 (2013.01); G06F 3/0383 (2013.01)

(58) Field of Classification Search
CPC . H04N 9/3194; G06F 3/03545; G06F 3/0383; G06F 3/04812; G06F 1/1618; G06F 1/1641; G06F 1/1643; G06F 1/1647; G06F 3/038; G06F 3/04883; G06F 9/543; G06F 2200/1614; G06F 3/03
See application file for complete search history.

(56) References Cited

U.S. PATENT DOCUMENTS

| | | | |
|---|---|---|---|
| 2005/0135678 A1 | 6/2005 | Wecker et al. | |
| 2010/0328200 A1* | 12/2010 | Yu | G06F 3/0386 |
| | | | 345/156 |
| 2014/0212042 A1* | 7/2014 | Shibata | G06F 3/04883 |
| | | | 382/188 |
| 2014/0253465 A1* | 9/2014 | Hicks | G06F 3/0488 |
| | | | 345/173 |
| 2014/0368410 A1 | 12/2014 | Imai et al. | |
| 2017/0017323 A1* | 1/2017 | Yu | G06F 3/04847 |
| 2019/0369752 A1* | 12/2019 | Ikeda | G06F 3/0346 |
| 2021/0271342 A1* | 9/2021 | Tomizawa | G06F 3/0425 |

FOREIGN PATENT DOCUMENTS

| | | |
|---|---|---|
| JP | 2005-166060 A | 6/2005 |
| JP | 2013-186869 A | 9/2013 |
| JP | 2014-075193 A | 4/2014 |
| JP | 2015-097070 A | 5/2015 |
| JP | 2018-092418 A | 6/2018 |

* cited by examiner

*Primary Examiner* — Lunyi Lao
*Assistant Examiner* — Jarurat Suteerawongsa
(74) *Attorney, Agent, or Firm* — Dority & Manning, P.A.

(57) ABSTRACT

A display method includes detecting a write operation on a display surface by a pointer, determining whether an operation button provided on the pointer is pressed or not, displaying an image corresponding to the write operation as a first image on the display surface, when the write operation is detected and it is determined that the operation button is pressed, and erasing the first image when it is determined that the operation button is not pressed during a period when the first image is displayed.

13 Claims, 7 Drawing Sheets

DISPLAY METHOD AND DISPLAY SYSTEM

The present application is based on, and claims priority from JP Application Serial Number 2021-052914, filed Mar. 26, 2021, the disclosure of which is hereby incorporated by reference herein in its entirety.

BACKGROUND

1. Technical Field

The present disclosure relates to a display method and a display system.

2. Related Art

JP-A-2018-92418 describes a browsing device having a touch panel display. In this browsing device, when a user inputs a writing to an electronic document displayed on the touch panel display, this writing is registered as a temporary writing. Subsequently, when a double tap on this writing is detected, this writing is changed to a permanent writing.

However, the foregoing device has a problem in that a double tap needs to be performed on each writing afterward to change a temporary writing to a permanent writing, thus resulting in complicated operations.

SUMMARY

A display method includes: detecting a write operation on a display surface by a pointer; determining whether an operation button provided on the pointer is pressed or not; displaying an image corresponding to the write operation as a first image on the display surface, when the write operation is detected and it is determined that the operation button is pressed; and erasing the first image when it is determined that the operation button is not pressed during a period when the first image is displayed.

A display system includes: a pointer having an operation button; a detection device detecting a write operation on a display surface by the pointer and determining whether the operation button is pressed or not; and a display device displaying an image corresponding to the write operation as a first image on the display surface, when the write operation is detected and it is determined that the operation button is pressed, and erasing the first image when it is determined that the operation button is not pressed during a period when the first image is displayed.

DESCRIPTION OF EXEMPLARY EMBODIMENTS

A display system according an embodiment will now be described with reference to the drawings.

Figure 1:
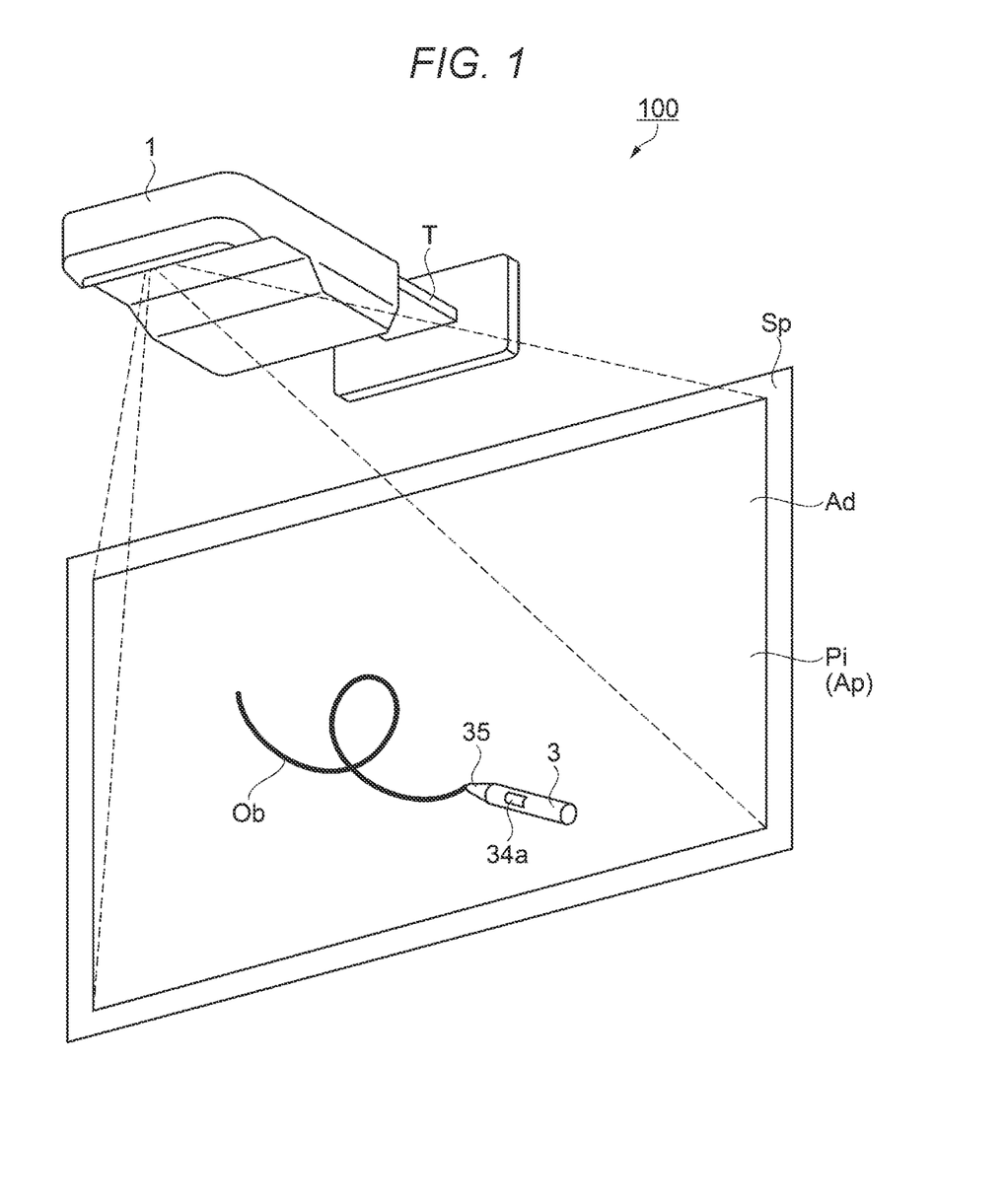
FIG. 1 is a perspective view showing a display system.

FIG. 1 is a perspective view showing a display system 100 according to this embodiment.

As shown in FIG. 1, the display system 100 has a projector 1 as a display device and a light pen 3 as a pointer. The projector 1 projects an input image Pi based on image information inputted from outside or image information stored inside in advance, onto a projection surface Sp as a display surface. The projector 1 in this embodiment is fixed to a wall surface via a fixing member T and projects an image onto the projection surface Sp arranged along the same wall surface. As the projection surface Sp, for example, a screen, a whiteboard or the like can be used. However, an image may be projected on the wall surface itself. That is, the wall surface may be used as the projection surface Sp.

The projector 1 can pick up an image over a range including a detection area Ad on the projection surface Sp and can detect a pointed position pointed by the light pen 3 in the detection area Ad, based on the position of light emitted from a light emitter 35 of the light pen 3. Therefore, when a user performs an operation like drawing on the projection surface Sp with the light pen 3, the projector 1 can project an image that looks like a line drawn along a trajectory of the pointed position, superimposed on the input image Pi projected up to this point. At the lateral side of the light pen 3, an operation button 34a that can be pressed by the user is provided. In this specification, the image drawn along the trajectory of the pointed position is referred to as an object Ob.

In this embodiment, the detection area Ad where the pointed position can be detected is assumed to be equal to a projection area Ap where the input image Pi is projected. However, the detection area Ad may be a broader or narrower range than the projection area Ap. Also, while the light pen 3 is assumed to emit infrared light in this embodiment, the light pen 3 may be configured to emit light in other wavelength ranges.

Figure 2:
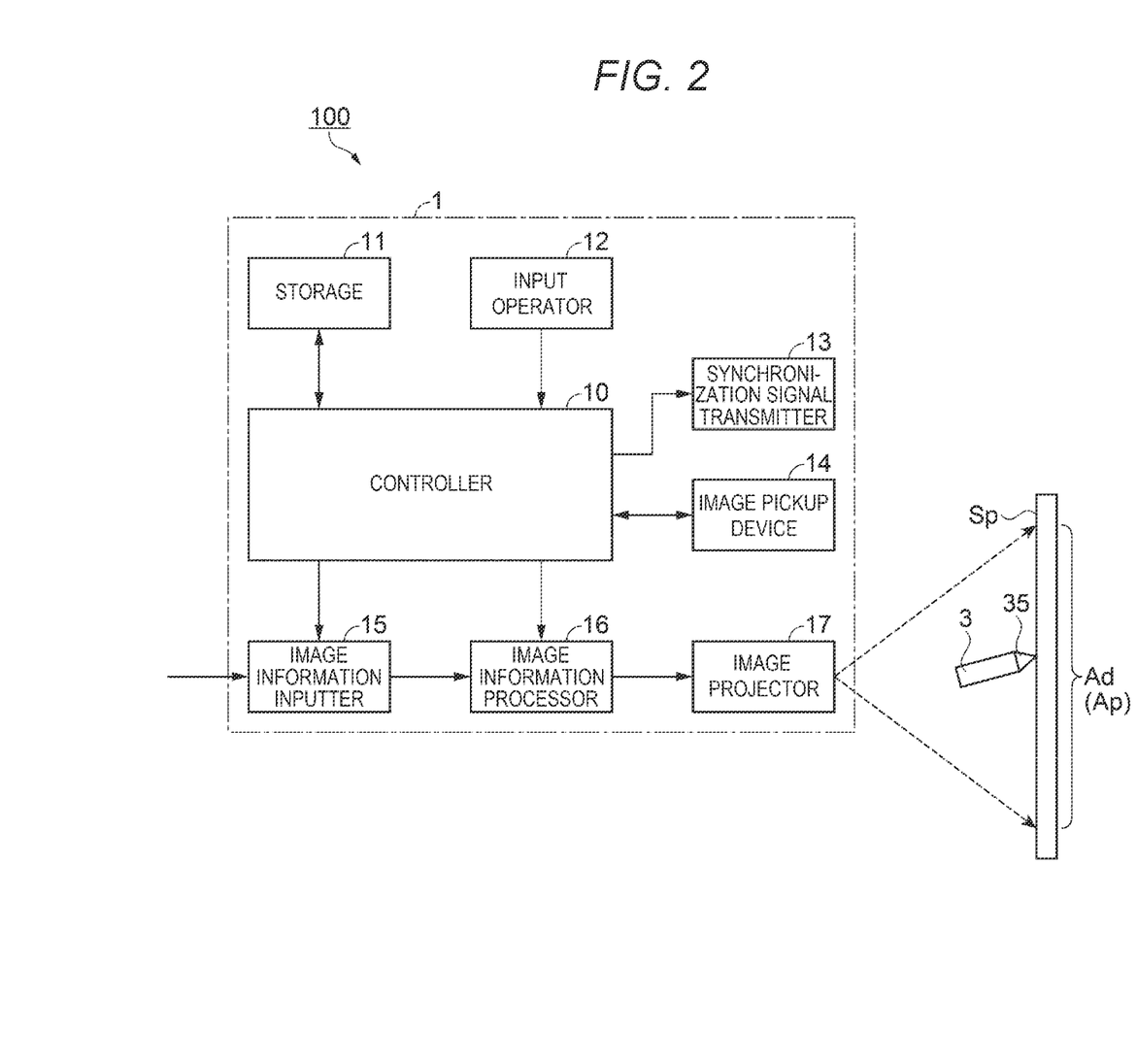
FIG. 2 is a block diagram showing a schematic configuration of a projector.
Figure 3:
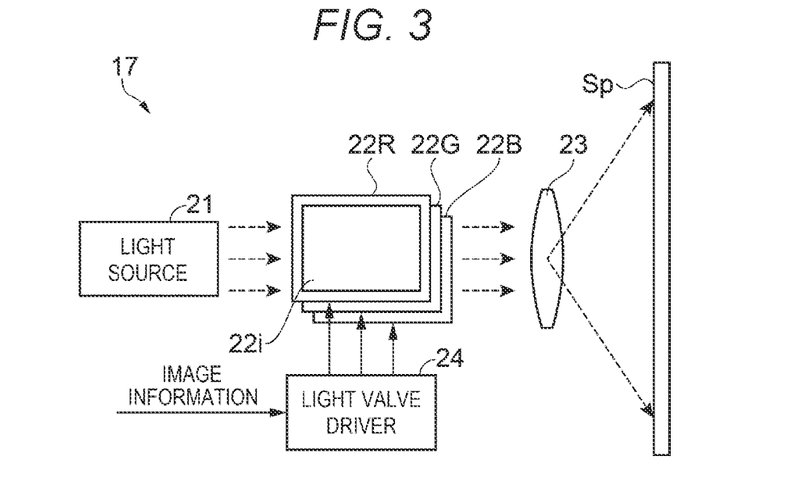
FIG. 3 is a block diagram showing a schematic configuration of an image projector.

FIG. 2 is a block diagram showing a schematic configuration of the projector 1. FIG. 3 is a block diagram showing a schematic configuration of an image projector 17 provided in the projector 1.

As shown in FIG. 2, the projector 1 has a controller 10, a storage 11, an input operator 12, a synchronization signal transmitter 13, an image pickup device 14, an image information inputter 15, an image information processor 16, and the image projector 17 as a display, which are integrated together. The projector 1 projects an image on the projection surface Sp from the image projector 17, based on image information inputted to the image information inputter 15.

The controller 10 has one or a plurality of processors. The controller 10 operates according to a control program stored in the storage 11 and thus comprehensively controls the operation of the projector 1.

The storage 11 has a memory such as a RAM (random-access memory) and a ROM (read-only memory). The RAM is used to temporarily store various data or the like. The ROM stores the control program and control data or the like for controlling the operation of the projector 1. The storage 11 may also store image information to be projected from the image projector 17.

The input operator 12 has a plurality of operation keys for the user to give various instructions to the projector 1. The operation keys provided in the input operator 12 include a "power key" for switching on and off the power supply, a "menu key" for displaying a menu for configuring various settings, a "direction key" for selecting a menu item, and the like. When the user operates various operation keys of the input operator 12, the input operator 12 outputs an operation signal corresponding to the content of the operation by the user, to the controller 10. Also, a remote controller, not illustrated, that can perform remote control may be used as the input operator 12. In this case, the remote controller sends an infrared operation signal corresponding to the content of the operation by the user, and a remote control signal receiver, not illustrated, receives this operation signal and transmits the operation signal to the controller 10.

The synchronization signal transmitter 13 has a light emitter for transmitting a synchronization signal, which is a pulse signal for synchronization, to the light pen 3. As a light source of the light emitter, for example, an LED (light-emitting diode) emitting infrared light is used. The synchronization signal transmitter 13 causes the light emitter to emit light periodically, for example, at a frequency of approximately several tens of Hertz under the control of the controller 10 and thus transmits a synchronization signal to the light pen 3. The light pen 3 periodically receives the synchronization signal and causes the light emitter 35 to emit light repeatedly at a timing synchronized with the received synchronization signal.

The image pickup device 14 is a camera having an image pickup element, not illustrated, such as a CCD (charge-coupled device) sensor or a CMOS (complementary metal-oxide semiconductor) sensor. The image pickup device 14 also has an infrared-transmissive filter absorbing visible light and transmitting infrared light and picks up an image of infrared light emitted from the light pen 3, via the infrared-transmissive filter. The image pickup device 14 picks up an image of the detection area Ad on the projection surface Sp under the control of the controller 10 and outputs picked-up image information, which is the result of the image pickup, to the controller 10. The controller 10 causes the image pickup device 14 to perform image pickup at a timing synchronized with the synchronization signal transmitted from the synchronization signal transmitter 13. That is, the image pickup device 14 repeats image pickup in synchronization with the timing when the light pen 3 emits light.

The image information inputter 15 is coupled to an external image supply device, not illustrated, such as a computer or an image playback device and receives image information supplied from the image supply device. The image information inputter 15 can also receive image information stored in the storage 11 and supplied from the controller 10. The image information inputter 15 outputs the inputted image information, that is, image information representing the input image Pi, to the image information processor 16.

The image information processor 16 under the control of the controller 10 performs various kinds of processing on the image information inputted from the image information inputter 15 and outputs the processed image information to a light valve driver 24 shown in FIG. 3 of the image projector 17. For example, the image information processor 16 performs, on the image information, processing of adjusting image quality such as brightness and contrast or processing of superimposing the object Ob, a notification image or the like on the input image Pi, according to need.

The image information inputter 15 and the image information processor 16 may be formed by one or a plurality of processors or may be formed by a dedicated processing device such as an ASIC (application-specific integrated circuit) or an FPGA (field-programmable gate array).

As shown in FIG. 3, the image projector 17 has a light source 21, three liquid crystal light valves 22R, 22G, 22B as light modulation devices, an optical projection system 23, the light valve driver 24, and the like. The image projector 17 modulates light emitted from the light source 21 by the liquid crystal light valves 22R, 22G, 22B to form image light, projects the image light from the optical projection system 23 including at least one of a lens and a mirror, and thus displays an image on the projection surface Sp.

The light source 21 includes a discharge-type light source lamp such as an ultra-high-pressure mercury lamp or a metal halide lamp, or a solid-state light source such as a light-emitting diode or a semiconductor laser. The light emitted from the light source 21 is converted into light having a substantially uniform luminance distribution by an optical integration system, not illustrated, and is separated into color light components of red, green, and blue, which are the three primary colors of light, by a color separation system, not illustrated. Subsequently, the color light components enter the corresponding liquid crystal light valves 22R, 22G, 22B.

Each of the liquid crystal light valves 22R, 22G, 22B is formed by a transmission-type liquid crystal panel or the like having a pair of transparent substrates with a liquid crystal enclosed between the substrates. In each liquid crystal panel, a rectangular image forming area 22i made up of a plurality of pixels arranged in the form of a matrix is formed. A drive voltage can be applied to the liquid crystal at each pixel.

The light valve driver 24 forms an image in the image forming area 22i of the liquid crystal light valves 22R, 22G, 22B. Specifically, the light valve driver 24 applies a drive voltage corresponding to the image information inputted from the image information processor 16, to each pixel in the image forming area 22i, and thus sets each pixel to a light transmittance corresponding to the image information. The light emitted from the light source 21 is transmitted through the image forming area 22i of the liquid crystal light valves 22R, 22G, 22B and thus modulated for each pixel, forming image light corresponding to the image information for each color light. The image lights of the individual colors, thus formed, are combined together for each pixel by a light combining system, not illustrated, and thus form image light representing a color image. This image light is projected in an enlarged form on the projection surface Sp by the optical projection system 23. Thus, the input image Pi based on the image information inputted to the image information inputter 15 is displayed on the projection surface Sp.

Figure 4:
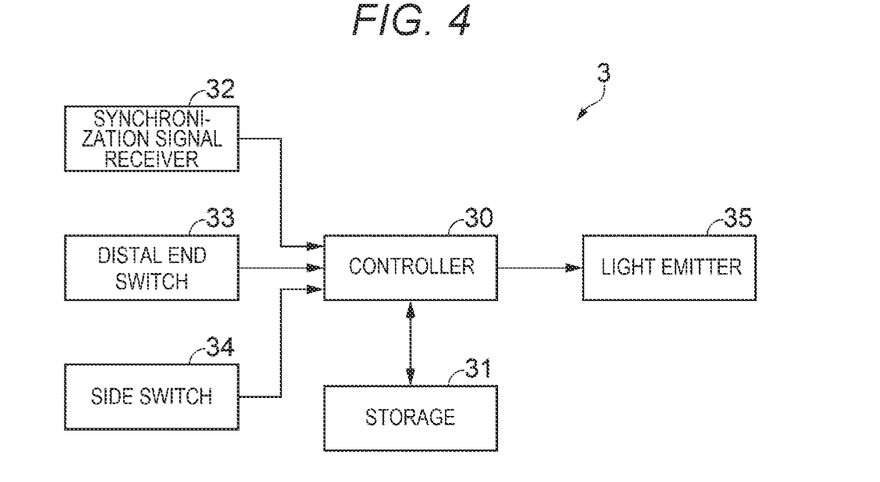
FIG. 4 is a block diagram showing a schematic configuration of a light pen.

FIG. 4 is a block diagram showing a schematic configuration of the light pen 3.

As shown in FIG. 4, the light pen 3 has a controller 30, a storage 31, a synchronization signal receiver 32, a distal end switch 33, a side switch 34, and the light emitter 35.

The controller 30 has one or a plurality of processors. The controller 30 operates according to a control program stored in the storage 31 and thus comprehensively controls the operation of the light pen 3.

The storage 31 is formed by a memory or the like storing the control program and control data or the like for controlling the operation of the light pen 3.

The synchronization signal receiver 32 is formed by a light receiving element or the like receiving infrared light. The synchronization signal receiver 32 receives the synchronization signal transmitted periodically from the synchronization signal transmitter 13 of the projector 1 and outputs the synchronization signal to the controller 30.

The distal end switch 33 is a switch turning on and off according to whether the switch is pressed or not. The distal end switch 33 is arranged at a distal end of the light pen 3. When an operation of pressing the distal end against the projection surface Sp or the like is performed, the distal end switch 33 detects the pressing of the distal end and outputs the result of the detection to the controller 30.

The side switch 34, too, is a switch turning on and off according to whether the switch is pressed or not. The side switch 34 detects a press on the operation button 34a arranged at the lateral side of the light pen 3 by the user and outputs the result of the detection to the controller 30.

The light emitter 35 has a light source such as an LED arranged near the distal end of the light pen 3 and emits infrared light under the control of the controller 30. The controller 30 causes the light emitter 35 to repeatedly emit light synchronously with the synchronization signal periodically received by the synchronization signal receiver 32. Specifically, the controller 30 divides, for example, one cycle of the synchronization signal into a plurality of periods called "phases". In several predetermined phases, of these phases, the controller 30 causes the light emitter 35 to emit light without exception and thus notifies the projector 1 of the pointed position of the light pen 3. Meanwhile, in the other phases, the controller 30 switches the presence and absence of the light emission by the light emitter 35, based on the states of the distal end switch 33 and the side switch 34. The controller 30 then notifies the projector 1 of the state of the distal end switch 33 and the state of the side switch 34, based on the transition of the light emission state of the light emitter 35 over a plurality of cycles, that is, the light emission sequence. In this specification, the phase in which the light emitter 35 is made to emit light without exception is referred to as a "position detection phase" and the phase in which the light emitter 35 is made to emit light based on the states of the distal end switch 33 and the side switch 34 is referred to as a "state determination phase".

Figure 5:
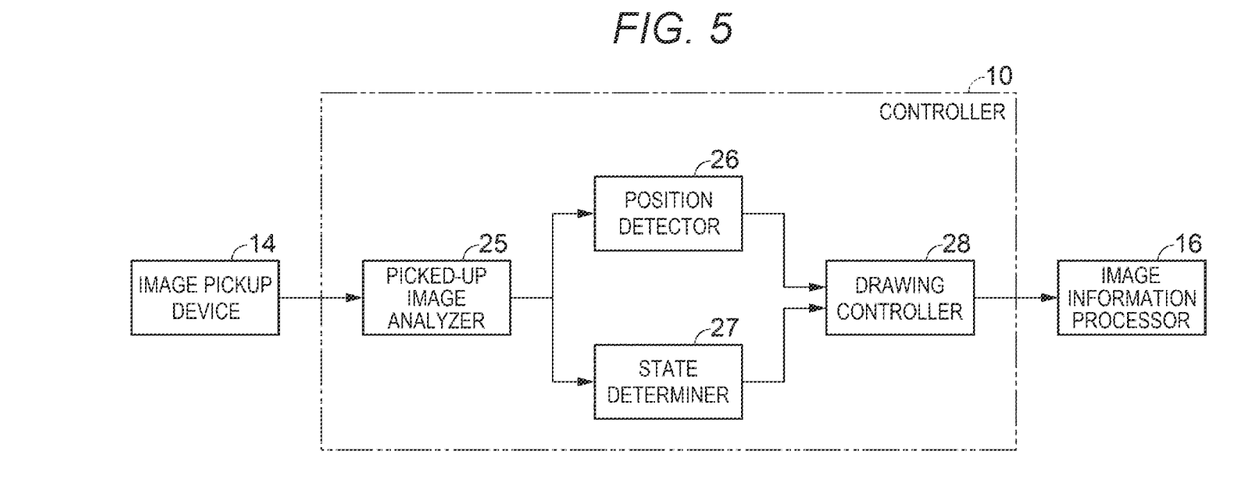
FIG. 5 is a block diagram showing a schematic configuration of a controller of the projector.

FIG. 5 is a block diagram showing a schematic configuration of the controller 10 of the projector 1.

As shown in FIG. 5, the controller 10 has a picked-up image analyzer 25, a position detector 26, a state determiner 27, and a drawing controller 28, as functional blocks implemented by the control program.

The picked-up image analyzer 25 analyzes each of the images based on the picked-up image information inputted from the image pickup device 14, that is, each of the picked-up images repeatedly picked up by the image pickup device 14, and outputs the result of the analysis to the position detector 26 and the state determiner 27. Specifically, the picked-up image analyzer 25 searches the detection area Ad within the picked-up image for the light emitted from the light pen 3 and specifies the presence or absence of light emission and the position thereof. The picked-up image analyzer 25 determines an image having a size within a predetermined range, of the infrared image included in the detection area Ad within the picked-up image, as the light from the light pen 3, and determines an image outside the predetermined range as a noise.

The position detector 26 detects a pointed position of the light pen 3, based on the result of analyzing a picked-up image picked up in the position detection phase, of the result of the analysis by the picked-up image analyzer 25. Specifically, the position detector 26 specifies the XY coordinates of the pointed position of the light pen 3 on the picked-up image. The correspondence between XY coordinates on the input image Pi and XY coordinates on the picked-up image is established by calibration processing performed in advance. The position detector 26 can transform the XY coordinates of the pointed position specified on the picked-up image to the XY coordinates on the input image Pi. The position detector 26 outputs the XY coordinates of the pointed position transformed to the coordinates on the input image Pi, to the drawing controller 28.

The state determiner 27 recognizes a light emission sequence of the light pen 3, based on the result of analyzing a picked-up image picked up in the state determination phase over a plurality of cycles, of the result of the analysis by the picked-up image analyzer 25. The state determiner 27 then determines the state of the distal end switch 33 and the state of the side switch 34 of the light pen 3, based on the recognized light emission sequence. The state determiner 27 outputs information representing the state of the distal end switch 33 and information representing the state of the side switch 34 thus determined, to the drawing controller 28. The state where the distal end switch 33 is pressed is the state where drawing is being performed with the distal end pressed against the projection surface Sp, that is, the state where a write operation is being performed. Therefore, the determination of the state of the distal end switch 33 by the state determiner 27 is equivalent to detecting a write operation. Also, the determination of the state of the side switch 34 by the state determiner 27 is equivalent to determining whether the operation button 34a is pressed or not. That is, the state determiner 27 functions as a detector detecting a write operation on the projection surface Sp and also functions as a determiner determining whether the operation button 34a is pressed or not. The image pickup device 14 generating a picked-up image, the picked-up image analyzer 25 analyzing the picked-up image, and the state determiner 27 determining the state of the distal end switch 33 and the state of the side switch 34, based on the result of the analysis, are equivalent to a detection device.

The drawing controller 28 controls the drawing of the object Ob, based on the XY coordinates of the pointed position outputted from the position detector 26, and the state of the distal end switch 33 and the state of the side switch 34 determined by the state determiner 27. For example, when the distal end switch 33 is pressed, the drawing controller 28 performs processing of drawing the dot-like object Ob at the pointed position on the input image Pi detected by the position detector 26 and causes the image information processor 16 to perform processing of displaying the drawn object Ob so as to be superimposed on the input image Pi. When the user moves the light pen 3 to move the pointed position, the object Ob is drawn in the form of a line along the trajectory of the pointed position, on the input image Pi.

The drawing controller 28 gives different attributes to the object Ob, depending on whether the operation button 34a is pressed or not, when a press operation on the distal end switch 33, that is, a write operation, is detected. Specifically, when a write operation is detected and the operation button 34a is pressed, the drawing controller 28 gives an attribute indicating a temporary image to the object Ob to be drawn and outputs the object Ob as a temporary object Ob1 to the image information processor 16. Meanwhile, when a write operation is detected and the operation button 34a is not pressed, the drawing controller 28 gives an attribute indicating a permanent image to the object Ob to be drawn and outputs the object Ob as a regular object Ob2 to the image information processor 16. Therefore, when performing a write operation, the user can select whether to use the temporary object Ob1 or the regular object Ob2 as the object Ob to be drawn, based on whether to perform a write operation while pressing the operation button 34a or perform a write operation without pressing the operation button 34a. The temporary object Ob1 and the regular object Ob2 may be different from each other or the same as each other in aspects of the object Ob such as color, thickness, and type of line. The aspects of the temporary object Ob1 and the aspects of the regular object Ob2 may be designated by the user, using a setting menu or the like, not illustrated. The temporary object Ob1 is equivalent to a first image. The regular object Ob2 is equivalent to a second image.

The temporary object Ob1, drawn when a write operation is performed in the state where the operation button 34a is pressed, is erased when the press on the operation button 34a is cancelled. Specifically, when the state determiner 27 determines that the operation button 34a is not pressed during a period when the temporary object Ob1 is displayed, the drawing controller 28 outputs an erase command to erase the temporary object Ob1 to the image information processor 16. The image information processor 16 erases the temporary object Ob1 in response to the erase command. Meanwhile, the regular object Ob2, which is a permanent image, continues to be displayed regardless of whether or not the operation button 34a is pressed during a period when the regular object Ob2 is displayed.

The display method by the projector 1 will now be described.

Figure 6:
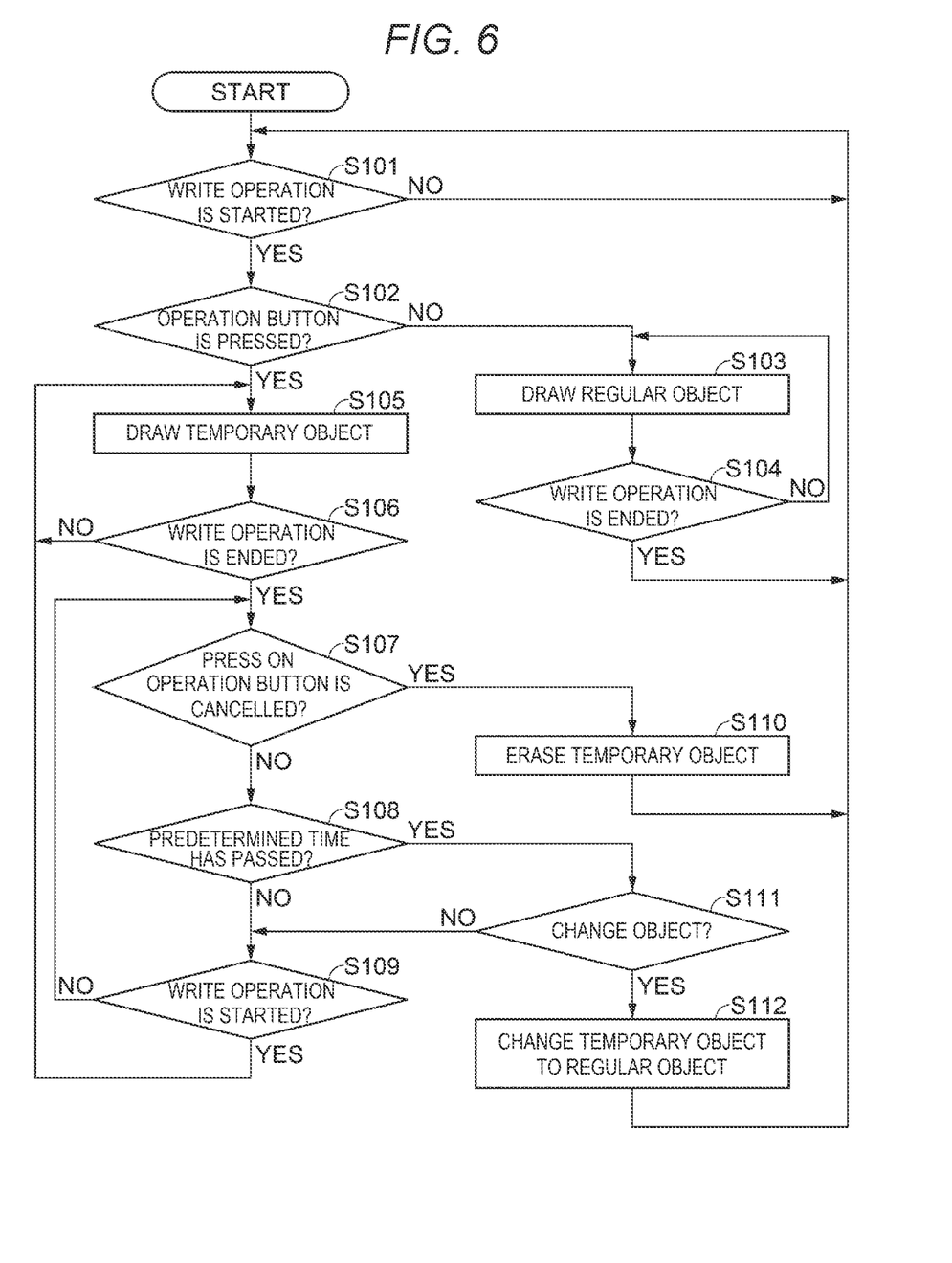
FIG. 6 is a flowchart for explaining an operation of a drawing controller.
Figure 7A:
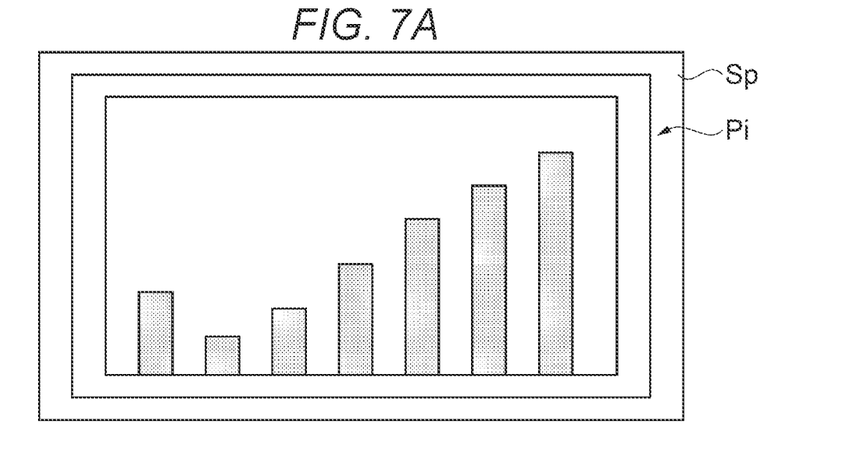
FIG. 7A is an explanatory view for explaining an operation of the drawing controller.
Figure 7B:
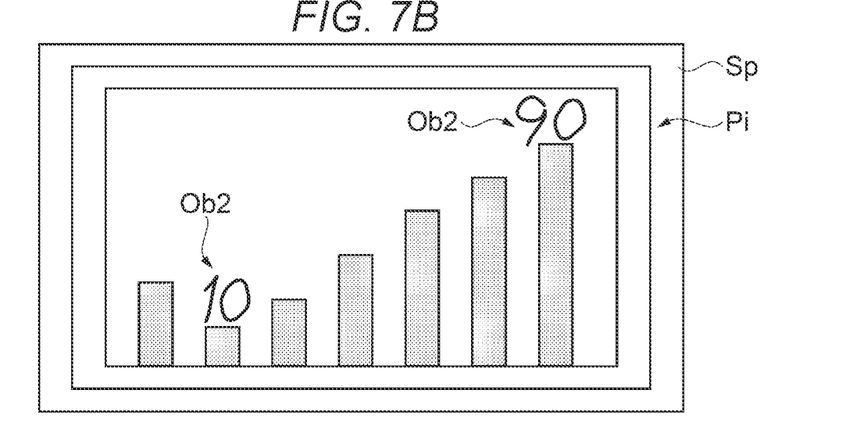
FIG. 7B is an explanatory view for explaining an operation of the drawing controller.
Figure 7C:
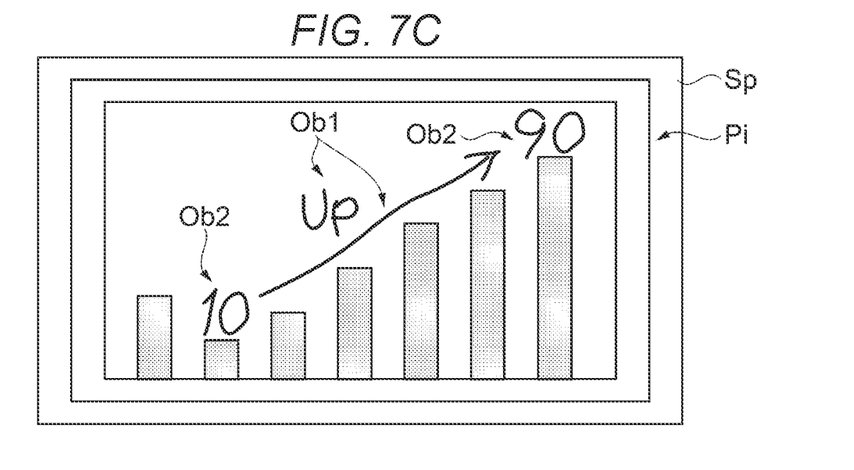
FIG. 7C is an explanatory view for explaining an operation of the drawing controller.
Figure 8:
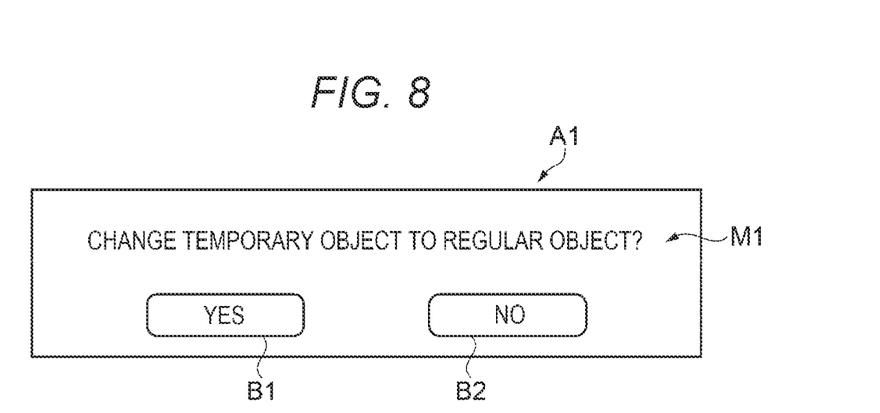
FIG. 8 shows a notification image displayed on a projection surface.

FIG. 6 is a flowchart for explaining the operation of the drawing controller 28. FIGS. 7A to 7C are explanatory views for explaining the operation of the drawing controller 28 and showing the projection surface Sp. FIG. 8 shows a notification image A1 displayed on the projection surface Sp.

In the state where the input image Pi is displayed on the projection surface Sp as shown in FIG. 7A, the drawing controller 28 in step S101 in FIG. 6 determines whether a write operation is started by the user or not, based on the state of the distal end switch 33 determined by the state determiner 27. When determining that the distal end switch 33 is pressed and that a write operation is started (YES in step S101), the drawing controller 28 shifts the processing to step S102. When determining that the distal end switch 33 is not pressed and that a write operation is not started (NO in step S101), the drawing controller 28 repeats this step.

When a write operation is started and the processing shifts to step S102, the drawing controller 28 determines whether the operation button 34a is pressed or not, based on the state of the side switch 34 determined by the state determiner 27. When determining that the operation button 34a is not pressed (NO in step S102), the drawing controller 28 shifts the processing to step S103. When determining that the operation button 34a is pressed (YES in step S102), the drawing controller 28 shifts the processing to step S105.

When the processing shifts to step S103, that is, when the user starts a write operation without pressing the operation button 34a, the drawing controller 28 draws the regular object Ob2 at the pointed position detected by the position detector 26. The drawing controller 28 then outputs the drawn regular object Ob2 to the image information processor 16 and causes the image information processor 16 to display the regular object Ob2 so as to be superimposed on the input image Pi.

Subsequently, in step S104, the drawing controller 28 determines whether the write operation is ended or not, based on the state of the distal end switch 33 determined by the state determiner 27. When determining that the distal end switch 33 is kept pressed and that the write operation is not ended (NO in step S104), the drawing controller 28 returns the processing to step 3103. When determining that the press on the distal end switch 33 is cancelled and that the write operation is ended (YES in step S104), the drawing controller 28 returns the processing to step S101. In this way, when the user repeats a write operation and a movement of the pointed position without pressing the operation button 34a, steps S101 to S104 are repeated in response to these operations and a plurality of regular objects Ob2 can be displayed on the input image Pi, as shown in FIG. 7B.

Meanwhile, when the processing shifts to step S105, that is, when the user starts a write operation while pressing the operation button 34a, the drawing controller 28 draws the temporary object Ob1 at the pointed position detected by the position detector 26. The drawing controller 28 then outputs the drawn temporary object Ob1 to the image information processor 16 and causes the image information processor 16 to display the temporary object Ob1 so as to be superimposed on the input image Pi.

Subsequently, in step S106, the drawing controller 28 determines whether the write operation is ended or not, based on the state of the distal end switch 33 detected by the state determiner 27. When determining that the distal end switch 33 is kept pressed and that the write operation is not ended (NO in step S106), the drawing controller 28 returns the processing to step S105. When determining that the press on the distal end switch 33 is cancelled and that the write operation is ended (YES in step S106), the drawing controller 28 shifts the processing to step S107.

When the write operation is ended and the processing shifts to step S107, the drawing controller 28 determines whether the press on the operation button 34a is cancelled or not, based on the state of the side switch 34 determined by the state determiner 27. When determining that the press on the operation button 34a is not cancelled, that is, that the operation button 34a is kept pressed (NO in step S107), the drawing controller 28 shifts the processing to step S108. When determining that the press on the operation button 34a is cancelled, that is, that the operation button 34a is not pressed (YES in step S107), the drawing controller 28 shifts the processing to step S110.

When the press on the operation button 34a is not cancelled and the processing shifts to step S108, the drawing controller 28 determines whether or not a predetermined time has passed since the write operation is ended in step S106 immediately before. As the predetermined time, for example, a time of approximately five seconds is set. When the predetermined time has not passed (NO in step S108), the drawing controller 28 shifts the processing to step S109. When the predetermined time has passed (YES in step S108), the drawing controller 28 shifts the processing to step S111.

When the predetermined time has not passed since the write operation is ended and the processing shifts to step S109, the drawing controller 28 determines whether a new write operation is started or not, based on the state of the distal end switch 33 determined by the state determiner 27. When determining that the distal end switch 33 is pressed and that a write operation is started (YES in step S109), the drawing controller 28 returns the processing to step S105. When determining that the press on the distal end switch 33 is kept cancelled and that a write operation is not started (NO in step S109), the drawing controller 28 returns the processing to step S107. In this way, when the user repeats a write operation and a movement of the pointed position while the operation button 34a is kept pressed, steps S105 to 3109 are repeated in response to these operations and a plurality of temporary objects Ob1 can be displayed on the input image Pi, as shown in FIG. 7C. These temporary objects Ob1 are displayed simultaneously with the regular object Ob2.

When it is determined in step S107 that the press on the operation button 34a is cancelled and the processing shifts to step S110, the drawing controller 28 outputs an erase command to erase the temporary object Ob1 to the image information processor 16 and returns the processing to step 3101. On receiving the erase command, the image information processor 16 erases only the temporary object Ob1, of all the objects Ob displayed as superimposed on the input image Pi. Thus, the state where only the input image Pi and the regular object Ob2 are displayed on the projection surface Sp returns, as shown in FIG. 7B.

When it is determined in step S108 that the predetermined time has passed with the operation button 34a kept pressed since the write operation is ended in step S106 immediately before and the processing shifts to step S111, the drawing controller 28 sends a notification asking the user whether or not to change the temporary object Ob1 drawn up to this point to the regular object Ob2. Specifically, the drawing controller 28 instructs the image information processor 16 to display the notification image A1 including a message M1 "Change temporary object to regular object?", a button image B1 showing "YES", and a button image B2 showing "NO", on the input image Pi, as shown in FIG. 8. The user can press the distal end of the light pen 3 on the button image B1 or the button image B2 displayed on the projection surface Sp and thus give an instruction about whether to change to the regular object Ob2 or not. When the user gives an instruction to change to the regular object Ob2 (YES in step S111), the drawing controller 28 shifts the processing to step S112. When the user gives an instruction not to change to the regular object Ob2 (NO in step S111), the drawing controller 28 resets the elapsed time that has passed since the write operation is ended, and then shifts the processing to step S109.

When the user gives an instruction to change to the regular object Ob2 and the processing shifts to step S112, the drawing controller 28 instructs the image information processor 16 to change the attribute of all the temporary objects Ob1 that are currently displayed, to the regular object Ob2, and returns the processing to step S101. Thus, all the objects Ob displayed at this point become regular objects Ob2. Even when the press on the operation button 34a is subsequently cancelled, the objects Ob are not erased and continue to be displayed.

As described above, the display system 100, the projector 1, and the display method by the projector 1 according to this embodiment can achieve the following effects.

(1) According to this embodiment, the temporary object Ob1 is drawn when a write operation is performed while the operation button 34a of the light pen 3 is pressed. The temporary object Ob1 is erased when the press on the operation button 34a is cancelled. Thus, an image to be temporarily displayed can be easily written.

(2) According to this embodiment, the regular object Ob2 is drawn when a write operation is performed without pressing the operation button 34a of the light pen 3. The regular object Ob2 is a permanent writing that continues to be displayed even after the temporary object Ob1, which is written while the operation button 34a is pressed, is subsequently erased by cancelling the press on the operation button 34a. That is, a temporary writing and a permanent writing can be easily switched, based on whether the operation button 34a is pressed or not.

(3) According to this embodiment, a notification about changing the temporary object Ob1 to the regular object Ob2 is given when the operation button 34a continues to be pressed for a predetermined time after the temporary object Ob1 is written by pressing the operation button 34a. Thus, a temporary writing can be easily changed to a permanent writing.

This notification asks about a change from the temporary object Ob1 to the regular object Ob2. When an instruction to change is given in response to the notification, the temporary object Ob1 is changed to the regular object Ob2. Thus, an unintended change from the temporary object Ob1 to the regular object Ob2 due to an operation error can be restrained.

The embodiment may be modified as follows.

Figure 9:
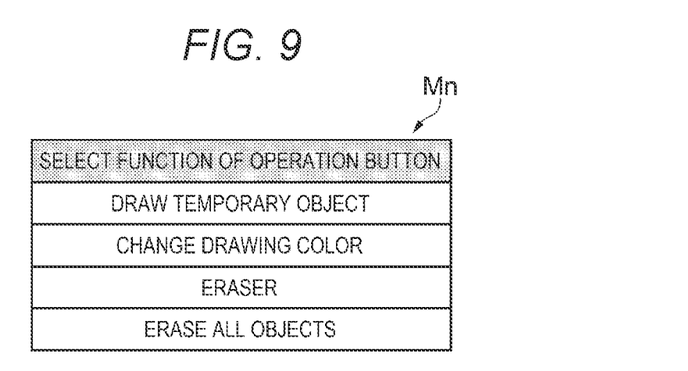
FIG. 9 shows a menu image according to a modification example.

In the embodiment, a configuration where the operation button 34a is used when drawing the temporary object Ob1 is described. However, other functions may be able to be allocated to the operation button 34a. For example, when a double push, that is, pressing the operation button 34a twice in a row, is executed, the drawing controller 28 may display a menu image Mn shown in FIG. 9 including a list of functions that can be allocated to the operation button 34a, on the input image Pi, and thus may allow the user to select a desired function. The selectable functions in the menu image Mn include, for example, "change drawing color" to change the drawing color of the object Ob, "eraser" to erase the object Ob currently displayed along the trajectory of the pointed position, "erase all objects" to erase all the currently displayed objects Ob, and the like, in addition to "draw temporary object" described in the embodiment. In this configuration, the user can change the function of the operation button 34a by pointing a desired function on the menu image Mn with the light pen 3.

Figure 10:
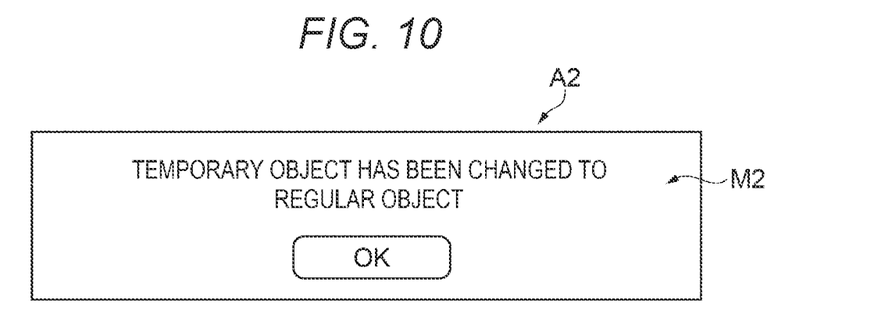
FIG. 10 shows a notification image according to a modification example.

In the embodiment, when the predetermined time has passed with the operation button 34a kept pressed in step 3108, the drawing controller 28 sends a notification asking the user whether to change the temporary object Ob1 to the regular object Ob2 or not. However, the temporary object Ob1 may be changed to the regular object Ob2 in response to the lapse of the predetermined time without asking the user. In this case, the drawing controller 28 may display, for example, a notification image A2 including a message M2 "Temporary object has been changed to permanent object" on the input image Pi as shown in FIG. 10 and thus may notify the user that the change to the regular object Ob2 is complete.

According to this configuration, as the operation button 34a is kept pressed for the predetermined time after the temporary object Ob1 is written by pressing the operation button 34a, the temporary object Ob1 is changed to the regular object Ob2 and the user is notified of the change. Thus, a temporary writing can be easily changed to a permanent writing and the user can quickly learn the change.

In the embodiment, the light pen 3 notifies the projector 1 of the state of the distal end switch 33 and the state of the side switch 34 by the light emission sequence of the light emitter 35. However, this configuration is not limiting. For example, both the projector 1 and the light pen 3 may have a communicator for wireless communication based on Bluetooth (trademark registered) or the like and the notification may be sent via these communicators. In this case, the projector 1 may also transmit the synchronization signal to be sent to the light pen 3, via the communicator.

In the embodiment, the image pickup device 14 is configured to pick up an image of infrared light emitted from the light pen 3, which is a pointer. However, this configuration is not limiting. For example, the image pickup device 14 may be configured to pick up an image of visible light and detect a pointer by pattern matching, edge detection or the like from the picked-up image. In this configuration, a light-emitting pointer such as the light pen 3 need not be used.

In the embodiment, a configuration where the detection device including the state determiner 27 detecting a write operation and determining a press on the operation button 34*a*, the image pickup device 14, and the image analyzer 25 is integrated with the projector 1, which is a display device, is described. However, the detection device may be separated from the projector 1.

In the embodiment, the transmission-type liquid crystal light valves 22R, 22G, 22B are used as light modulation devices. However, a reflection-type light modulation device such as a reflection-type liquid crystal light valve can be used. Also, a digital micromirror device or the like that controls the exit direction of incident light for each micromirror as a pixel and thus modulates the light emitted from the light source 21 can be used. The configuration having a plurality of light modulation devices corresponding to individual color lights is not limiting. A configuration having a single light modulation device modulating a plurality of color lights in time division may be employed.

In the embodiment, the projector 1 is described as an example of the display device. However, the display device is not limited to the projector 1 and may be other types of display devices such as a liquid crystal display and an organic EL display.

What is claimed is:

1. A display method comprising:
   detecting a write operation on a display surface by a pointer;
   determining whether an on operation button provided on the pointer is pressed or not;
   displaying a first image corresponding to the write operation on the display surface, when the write operation is detected and it is determined that the on operation button is pressed such that pressing the on operation button is configured with a display function;
   erasing the first image when it is determined that the on operation button is cancelled; and
   changing the first image to a second image corresponding to the write operation on the display surface when it is determined that the on operation button was previously pressed and the predetermined time has passed without the on operation button cancelled;
   displaying the second image corresponding to the write operation on the display surface, when the write operation is detected and it is determined that the on operation button is not pressed.

2. The display method according to claim 1, wherein the first image comprises a temporary object and the second image comprises a regular object.

3. The display method according to claim 1, wherein outputting a notification about changing the first image to the second image, when an end of the write operation is detected during the period when the first image is displayed and it is determined that the on operation button is kept pressed for a time length since the end of the write operation is detected.

4. The display method according to claim 3, wherein the notification is a notification asking whether to change the first image to the second image or not, and the method further comprising
   changing the first image the second image when an instruction to change to the second image is received in response to the notification.

5. The display method according to claim 3, further comprising:
   changing the first image to the second image, when the end of the write operation is detected during the period when the first image is displayed and it is determined that the on operation button is kept pressed for the time length since the end of the write operation is detected, wherein
   the notification is a notification that the first image is changed to the second image.

6. The display method according to claim 1, wherein the predetermined time is approximately five seconds.

7. A display system comprising:
   a pointer having an on operation button;
   a detection device configured to detect a write operation on a display surface by the pointer and determine whether the on operation button is pressed or not; and
   a display device
      configured to display a first image corresponding to the write operation on the display surface, when the write operation is detected and it is determined that the on operation button is pressed such that pressing the on operation button is configured with a display function,
      configured to erase the first image when it is determined that the on operation button is cancelled, and
      configured to change the first image to a second image corresponding to the write operation on the display surface when it is determined that the on operation button was previously pressed and the predetermined time has passed without the on operation button cancelled;
      configured to display the second image corresponding to the write operation on the display surface, when the write operation is detected and it is determined that the on operation button is not pressed.

8. The display system according to claim 7, wherein the predetermined time is approximately five seconds.

9. The display system according to claim 7, wherein the first image comprises a temporary object and the second image comprises a regular object.

10. A display method comprising:
    detecting a write operation on a display surface by a pointer;
    determining whether an on operation button provided on the pointer is pressed or not;
    displaying a first image corresponding to the write operation on the display surface, when the write operation is detected and it is determined that the on operation button is pressed such that pressing the on operation button is configured with a display function;
    erasing the first image when it is determined that the on operation button is cancelled;
    displaying a second image corresponding to the write operation on the display surface, when the write operation is detected and it is determined that the on operation button is not pressed;

outputting a notification about changing the first image to the second image, when an end of the write operation is detected during the period when the first image is displayed and it is determined that the on operation button is kept pressed for a predetermined time length since the end of the write operation is detected, and changing the first image to the second image in response to the notification.

11. The display method according to claim 10, further comprising:

continuing to display the second image when it is determined that the on operation button is not pressed during a period when the first image and the second image are displayed.

12. The display method according to claim 10, wherein the notification is a notification asking whether to change the first image to the second image or not.

13. The display method according to claim 10, wherein the first image comprises a temporary object and the second image comprises a regular object.

\* \* \* \* \*